Nov. 18, 1924.  
H. TRUST ET AL  
MIXING AND BEATING MACHINE  
Filed June 16, 1920  
1,515,633
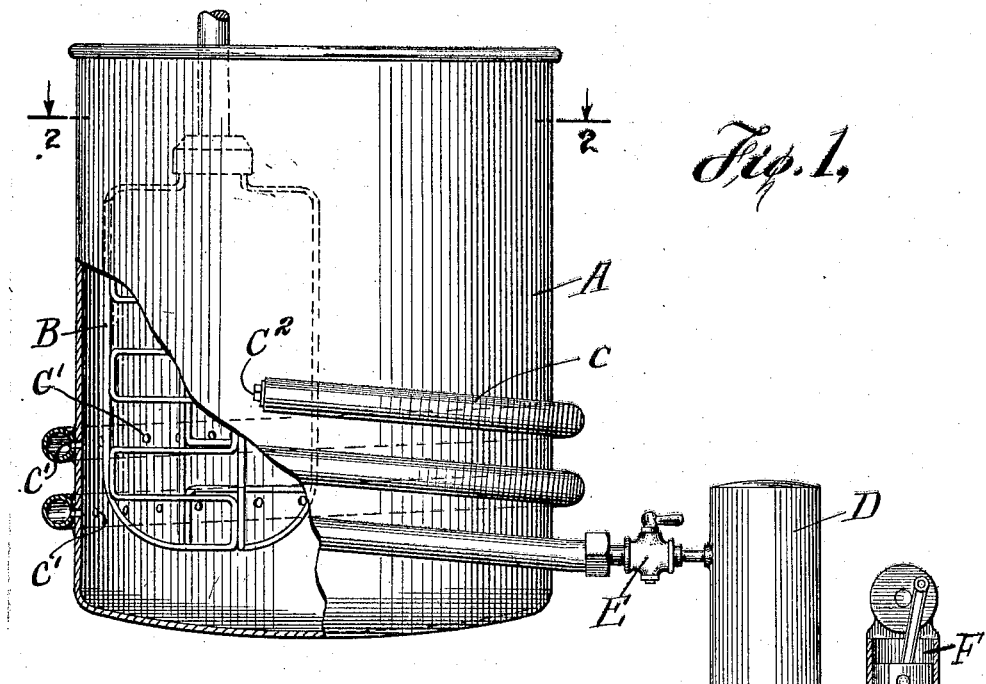
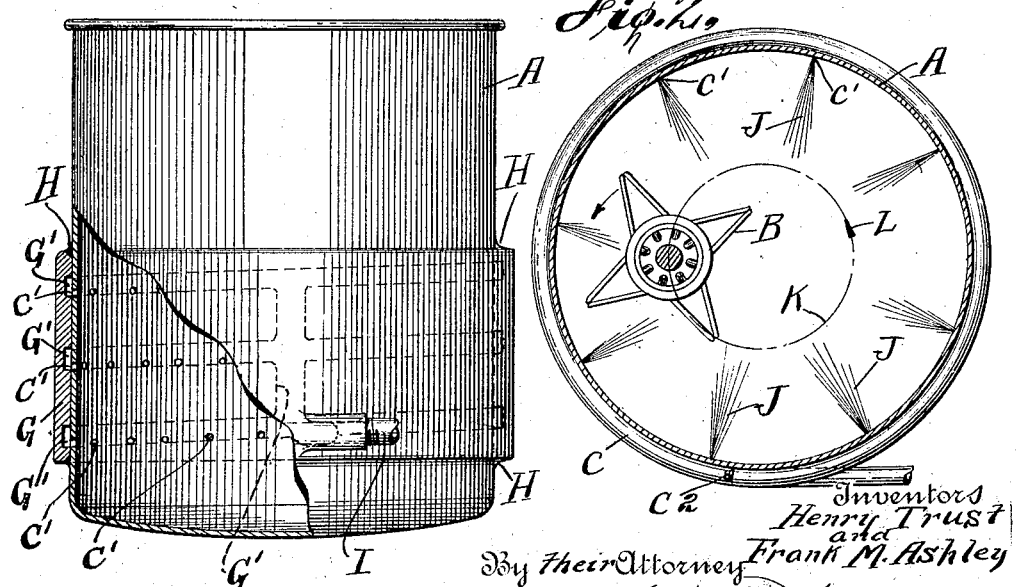
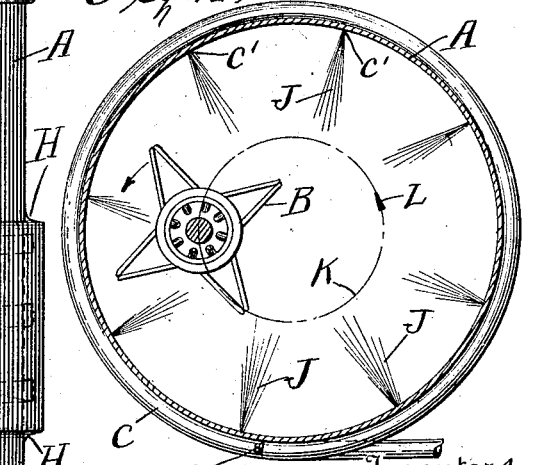
Inventors  
Henry Trust  
and  
Frank M. Ashley  
By their Attorney Patented Nov. 18, 1924.

1,515,633

UNITED STATES PATENT OFFICE.

HENRY TRUST, OF PARK RIDGE, NEW JERSEY, AND FRANK M. ASHLEY, OF BROOKLYN, NEW YORK; JOSEPHINE TRUST ADMINISTRATRIX OF SAID HENRY TRUST, DECEASED.

MIXING AND BEATING MACHINE.

Application filed June 16, 1920. Serial No. 339,340.

*To all whom it may concern:*

Be it known that we, HENRY TRUST, a citizen of the United States, and resident of Park Ridge, in the county of Bergen and State of New Jersey, and FRANK M. ASHLEY, a citizen of the United States, and resident of Brooklyn, in the county of Kings and State of New York, have invented certain new and useful Improvements in Mixing and Beating Machines, of which the following is a specification.

Our invention relates to mixing and beating machines and the object of our invention is to provide a machine adapted to mix and beat food stuffs such as the whites of eggs, cream, and such other elements as require to be formed in light flakes or emulsified. We have discovered that air or other suitable gas will assist in preparing such foods if properly introduced into the said foods under pressure while the food is being agitated or stirred by a beater.

Referring to the drawings which form a part of this specification:

Figure 1 is an elevational view of a machine, shown partly in section, which embodies our invention.

Figure 2 is a plan view taken on line 2—2 of Figure 1.

Figure 3 is an elevational view shown partly in section, illustrating a good way to make the container and gas conduit construction.

A indicates a sheet metal receptacle of the usual character employed for use with mixing and beating machines, and B indicates a beater which is rotated as it revolves in the receptacle in the usual manner well known in this art. C indicates a tube coiled about the lower end of the receptacle A and closed at one end by a removable plug $C^2$. The tube is soldered or otherwise suitably fastened to the outer surface of the receptacle, and small conduits C'—C' etc., are made through the wall of the receptacle and tube through which the gas flows from a reservoir D under pressure controlled by the reducing valve E. F indicates a pump which compresses the gas in said reservoir. In Figure 3 is shown a metal band G having a number of conduits G'—G'—G' which are connected by a vertical passage G' indicated in dotted lines. This band is secured to the receptacle by rings of solder H—H respectively, which extend entirely around the receptacle. A pipe I is connected to said band in open communication with the conduits G', and leads the gas from the reservoir D thereto. J—J etc., indicate the gas being sprayed into the receptacle in the path of the rotating beater B which revolves on the circle K as indicated by the arrow L.

In operation the beater rotates and revolves across the gas jets which cause the gas to be deflected and broken up into a greater number of jets, and by reason of the ingredients being whipped by the beater while the gas is flowing into the mass, the ingredients absorb a portion of the gas or enclose it in the form of small bubbles, and the surplus gas escapes from the open top of the receptacle. By this new method and construction, the ingredients may be properly prepared in a shorter time than by the old methods and machines and form a more perfect product.

Having thus described our invention, we claim as new and desire to secure by Letters Patent:

1. In a mixing and beating machine including a beater, a receptacle in the form of a bowl having a smooth interior, a band mounted on the outer surface of the bowl, a conduit formed between the band and the adjacent bowl portion to encircle the latter in air tight relation to the exterior, openings leading from the conduit through the wall of the bowl to form outlets, and an inlet for the conduit formed in the band directly communicating with all of said outlet openings and adapted to be connected to a fluid pressure source, said outlets being arranged in vertical and in horizontal spaced relation for directing the fluid from the conduit into the path movement of the said beater.

2. In a mixing and beating machine including a beater, a receptacle in the form of a bowl having a smooth interior and a closed bottom, a band firmly secured on the outer surface of the bowl, a conduit formed between the band and the adjacent bowl portion to encircle the latter in air tight relation to the exterior, openings leading from the conduit through the wall of the bowl to form outlets, and an inlet for the conduit formed in the band directly communicating with all outlets and adapted to be connected to a fluid source, said conduit being helical shaped for arranging the said outlets in vertical and horizontal spaced relation to direct the fluid from the conduit into the path of movement of the said beater.

3. In a mixing and beating machine including a beater, a receptacle in the form of a bowl having a smooth interior, a band mounted on the outer surface of the bowl, a conduit formed between the band and the adjacent bowl portion to encircle the latter in air tight relation to the exterior, openings leading from the conduit through the wall of the bowl to form outlets, said opening being positioned at the the bottom side of conduit to drain same, and an inlet for the conduit formed in the band directly communicating with all of said outlet openings and adapted to be connected to a fluid pressure source, said outlets directing the fluid from the conduit into the path of movement of the said beater.

4. In a mixing and beating machine including a beater, a receptacle in the form of a bowl having a smooth interior and a closed bottom, a band firmly secured on the outer surface of the bowl, a conduit formed between the band and the adjacent bowl portion to helically encircle the latter in air tight relation to the exterior, openings leading from the conduit through the wall of the bowl to form outlets, said opening being positioned at the bottom side of conduit to drain same, and an inlet for the conduit formed in the band directly communicating with all outlets and adapted to be connected to a fluid source, said outlets arranged to direct the fluid from the conduit into the path of movement of the said beater.

Signed at New York city in the county of New York and State of New York this 10th day of June, A. D. 1920.

HENRY TRUST.
FRANK M. ASHLEY.